US008086961B2

(12) United States Patent
Saeki et al.

(10) Patent No.: US 8,086,961 B2
(45) Date of Patent: Dec. 27, 2011

(54) IMAGE PROCESSING APPARATUS, IMAGE FORMING APPARATUS, AND COMPUTER PROGRAM PRODUCT

(75) Inventors: Iwao Saeki, Kanagawa (JP); Tetsuya Sakayori, Tokyo (JP); Junichi Takami, Kanagawa (JP); Takashi Yano, Tokyo (JP); Haruo Shida, Kanagawa (JP); Yoshifumi Sakuramata, Tokyo (JP); Takanori Nagahara, Kanagawa (JP); Hiroko Mano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 935 days.

(21) Appl. No.: 11/987,500

(22) Filed: Nov. 30, 2007

(65) Prior Publication Data

US 2008/0134027 A1 Jun. 5, 2008

(30) Foreign Application Priority Data

Dec. 5, 2006 (JP) ................................. 2006-328531

(51) Int. Cl.
*G06F 17/00* (2006.01)
(52) U.S. Cl. ........................................ 715/274
(58) Field of Classification Search .................. 715/273, 715/274, 277, 247
See application file for complete search history.

(56) References Cited

U.S. PATENT DOCUMENTS

| | | | | |
|---|---|---|---|---|
| 5,483,296 A * | 1/1996 | Nonweiler | ..................... | 348/719 |
| 6,686,930 B2 * | 2/2004 | Powers et al. | .................. | 715/724 |
| 7,016,553 B2 * | 3/2006 | Craver et al. | ................. | 382/305 |
| 7,298,520 B2 * | 11/2007 | Ohkubo et al. | ............... | 358/1.18 |
| 7,318,202 B2 * | 1/2008 | Sugiyama et al. | ............ | 715/788 |
| 7,689,915 B2 * | 3/2010 | Kitamaru et al. | .............. | 715/711 |
| 7,756,866 B2 * | 7/2010 | Bhalotia et al. | ............... | 707/723 |
| 7,830,399 B2 * | 11/2010 | Benson et al. | ................ | 345/619 |
| 2002/0184630 A1 * | 12/2002 | Nishizawa et al. | ............. | 725/44 |
| 2002/0196346 A1 * | 12/2002 | Nishio et al. | ............... | 348/207.2 |
| 2003/0065590 A1 * | 4/2003 | Haeberli | ......................... | 705/27 |
| 2003/0137506 A1 * | 7/2003 | Efran et al. | .................... | 345/419 |
| 2003/0147097 A1 * | 8/2003 | Kotani et al. | ................. | 358/1.18 |
| 2004/0107854 A1 * | 6/2004 | Nakatani et al. | .............. | 101/484 |
| 2004/0169873 A1 * | 9/2004 | Nagarajan | ...................... | 358/1.9 |
| 2004/0252286 A1 * | 12/2004 | Murray et al. | .................. | 355/28 |
| 2005/0025548 A1 * | 2/2005 | Kim | ................................ | 400/62 |
| 2005/0078974 A1 * | 4/2005 | Uchida et al. | .................. | 399/81 |
| 2005/0117811 A1 * | 6/2005 | Hoshino | ....................... | 382/260 |
| 2005/0203763 A1 * | 9/2005 | Sesek et al. | ....................... | 705/1 |
| 2005/0262274 A1 * | 11/2005 | Aoki et al. | ...................... | 710/15 |
| 2005/0270601 A1 * | 12/2005 | Rodrigues et al. | ............ | 358/527 |

(Continued)

FOREIGN PATENT DOCUMENTS

| | | |
|---|---|---|
| JP | 08-279884 | 10/1996 |
| JP | 11-234503 | 8/1999 |
| JP | 2001-285534 | 10/2001 |
| JP | 2002-103726 | 4/2002 |
| JP | 2003-005471 | 1/2003 |
| JP | 2006-003568 | 1/2006 |

*Primary Examiner* — Laurie Ries
(74) *Attorney, Agent, or Firm* — Dickstein Shapiro LLP

(57) ABSTRACT

A preview creating unit creates a plurality of previews of an image corresponding to a plurality of preset values each indicating processing to be applied to the image. A display unit displays the previews in a selectable manner, and, upon receiving a signal indicating a preview selected from the previews displayed thereon, displays the selected preview. The preview creating unit updates, upon receiving input of setting for the selected preview, the selected preview based on the setting to create a new preview. The display unit displays the new preview.

14 Claims, 8 Drawing Sheets

U.S. PATENT DOCUMENTS

| | | | |
|---|---|---|---|
| 2005/0275879 A1* | 12/2005 | Ogasawara | 358/1.15 |
| 2005/0278625 A1* | 12/2005 | Wessling et al. | 715/527 |
| 2005/0286100 A1* | 12/2005 | Uotani et al. | 358/527 |
| 2006/0023240 A1* | 2/2006 | Natori | 358/1.13 |
| 2006/0033956 A1* | 2/2006 | Takahashi | 358/1.15 |
| 2006/0064716 A1* | 3/2006 | Sull et al. | 725/37 |
| 2006/0075339 A1* | 4/2006 | Tomita et al. | 715/530 |
| 2007/0052856 A1* | 3/2007 | Jung et al. | 348/565 |

* cited by examiner

FIG. 4

| SETTING ITEM | POSITION (UPPER LEFT AND LOWER RIGHT COORDINATES) |
|---|---|
| STAPLE | (0, 0) (40, 40) |
|  | (120, 0) (160, 40) |
| PUNCH | (0, 40) (40, 270) |
|  | (40, 0) (200, 40) |
| MARGIN SHIFT |  |

IMAGE PROCESSING APPARATUS, IMAGE FORMING APPARATUS, AND COMPUTER PROGRAM PRODUCT

CROSS-REFERENCE TO RELATED APPLICATIONS

The present application claims priority to and incorporates by reference the entire contents of Japanese priority document 2006-328531 filed in Japan on Dec. 5, 2006.

BACKGROUND OF THE INVENTION

1. Field of the Invention

The present invention relates to an image processing apparatus, an image forming apparatus, and a computer program product.

2. Description of the Related Art

Image forming apparatuses such as copiers, facsimile machines, printers, and multifunction products (MFPs) that combine any or all of the functions of these allow a user to select a function and specify required settings for the function. The settings includes those concerning an original such as type and density of the original, those concerning image processing such as zoom ratio, simplex/duplex printing, and a margin size, and those concerning finishing such as sorting, stapling, and punching.

However, in the conventional image forming apparatuses, vast numbers of settings are available to the user to select and set, making it difficult to select the settings required to obtain the desired process result.

To solve such a problem, Japanese Patent Application Laid-open No. H8-279884 discloses an image processing device in which, when an original document is placed on a contact glass and a cover placed on the original document, pre-scanning takes place. It is automatically determined based on the image obtained as a result of pre-scanning whether the original image is a color image or a black and white image, or whether the scanned image is text portion or image portion, etc., improving the operability for the user.

Further, Japanese Patent Application Laid-open No. 2001-285534 discloses an image forming apparatus that provides a way of easily setting the conditions for scanning the original document by storing beforehand the settings as a group in an associated form with the scanning condition button displayed in the image forming apparatus, and recalling the settings group when the scanning condition button is selected by the user, allowing the user to change the settings in the group.

Thus, in one conventional technology described above, reduction of the number of function setting items is achieved by filtering the function setting based on the pre-scanned image of the original document, while in the other conventional technology, the setting of scanning conditions is simplified by provision of a scanning condition button.

There are other conventional technologies such as a preview display device disclosed in Japanese Patent Application Laid-open No. 2003-005471 that displays a preview of an image as it would appear upon being printed, an image forming apparatus disclosed in Japanese Patent Application Laid-open No. 2002-103726 that displays a print preview image on a selected sheet, and an image forming system disclosed in Japanese Patent Application Laid-open No. H11-234503 that composites edited image data, and displays a preview of the composite image.

All the above conventional technologies are concerned with preview display of either a single image data or a plurality of images composited on a single page based on the specified settings. By adjusting the settings based on the preview image, it can be ensured that the final print output meets the user's requirements.

However, the conventional technologies still has a room to be improved in terms of selection operation of suitable function setting items and operability.

In other words, the technologies disclosed in Japanese Patent Application Laid-open Nos. H8-279884 and 2001-285534 are inadequate where selection of suitable and unambiguous function setting items for different processes of the image being processed is concerned, thus requiring improved selection operation of appropriate function setting items as well as improved operability.

Similarly, the technologies disclosed in Japanese Patent Application Laid-open Nos. 2003-005471, 2002-103726, and H11-234503 also fall short when it comes to appropriate and clear function setting items for different processes of the image being processed, as only a preview is displayed and no setting operations for the process to which the image is subjected is possible. Hence, again improved selection operation of appropriate function setting items as well as improved operability is required.

SUMMARY OF THE INVENTION

It is an object of the present invention to at least partially solve the problems in the conventional technology.

According to an aspect of the present invention, an image processing apparatus includes: a first preview creating unit that creates a plurality of first previews of an image corresponding to a plurality of preset values each indicating processing to be applied to the image; a first displaying unit that displays the first previews in a selectable manner on a display screen; a second displaying unit that displays, upon receiving a signal indicating a preview selected from the first previews, selected preview on the display screen; a second preview creating unit that updates, upon receiving input of setting for the selected preview, the selected preview based on the setting to create a second preview; and a third displaying unit that displays the second preview on the display screen.

According to another aspect of the present invention, an image forming apparatus includes: an input unit that receives input of an image; a first preview creating unit that creates a plurality of first previews of the image corresponding to a plurality of preset values each indicating processing to be applied to the image; a first displaying unit that displays the first previews in a selectable manner on a display screen; a second displaying unit that displays, upon receiving a signal indicating a preview selected from the first previews, selected preview on the display screen; a second preview creating unit that updates, upon receiving input of setting for the selected preview, the selected preview based on the setting to create a second preview; a third displaying unit that displays the second preview on the display screen; and a printing unit that prints the image based on the second preview.

According to still another aspect of the present invention, a computer program product includes a computer usable medium having computer readable program codes embodied in the medium that, when executed, causes a computer to execute: creating a plurality of first previews of an image corresponding to a plurality of preset values each indicating processing to be applied to the image; displaying the first previews in a selectable manner; displaying, upon receipt of a signal indicating a preview selected from the first previews, selected preview; updating, upon receipt of input of setting for the selected preview, the selected preview based on the setting to create a second preview; and displaying the second preview.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of an association table in which setting items are associated with positions;

DETAILED DESCRIPTION OF THE PREFERRED EMBODIMENTS

Exemplary embodiments of the present invention are explained in detail below with reference to the accompanying drawings.

A first embodiment of the present invention is explained referring to FIGS. 1 to 7. An image processing apparatus and an image forming apparatus according to the first embodiment is explained below as a multifunction product (MFP) that combines any or all of such functions as copy function, facsimile (FAX) function, printing function, scanning function, and function of delivering an input image (an original image scanned by the scanner function or an image received by the FAX function).

Figure 1:
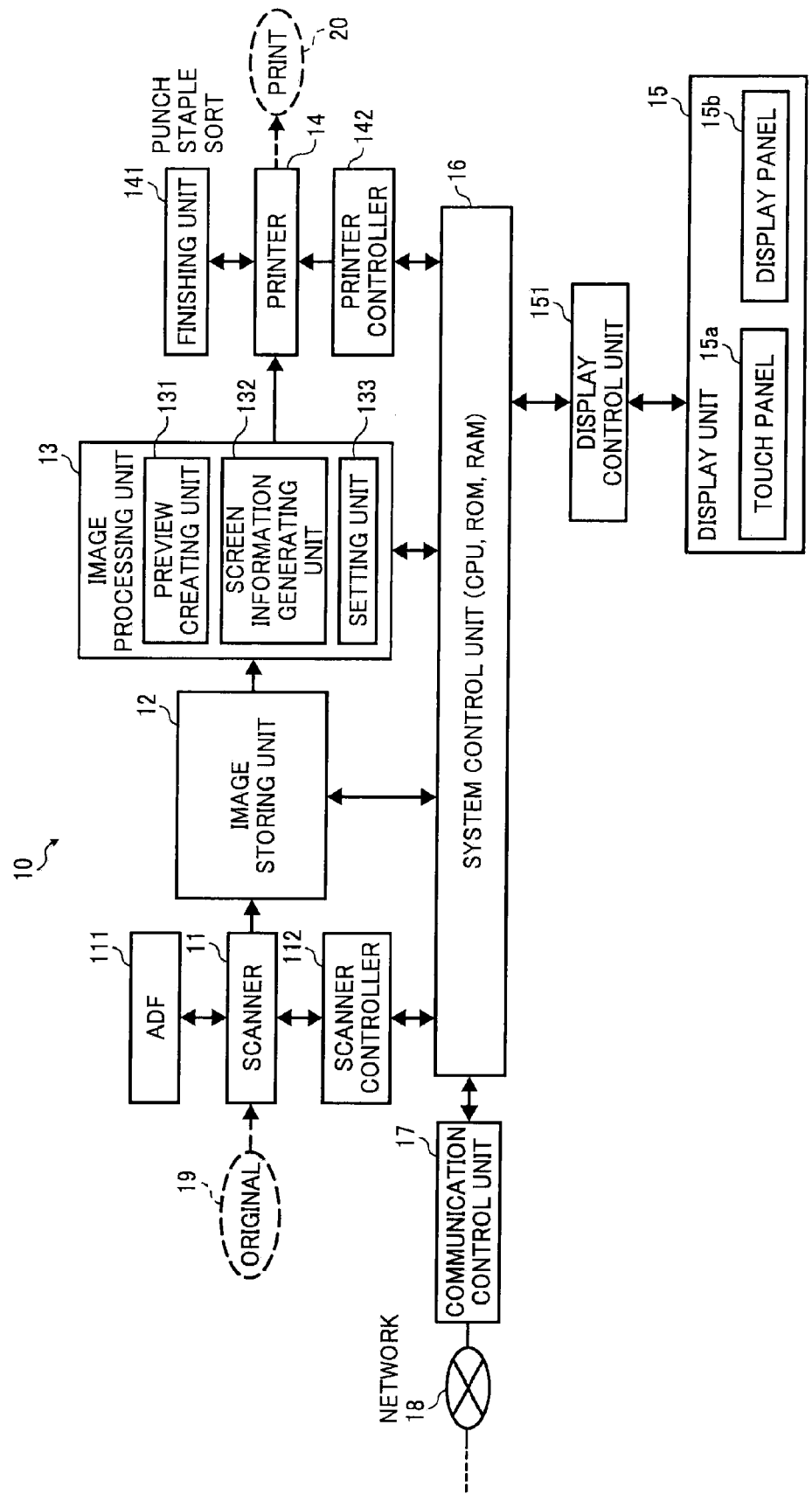
FIG. 1 is a functional block diagram of an image processing apparatus or an image forming apparatus according to a first embodiment of the present invention.

FIG. 1 is a functional block diagram of an MFP 10 according to the first embodiment. The MFP 10 includes a scanner 11, an auto document feeder (ADF) 111, a scanner controller 112, an image storing unit 12, an image processing unit 13, a printer 14, a printer controller 142, a finishing unit 141, a display unit 15, a display control unit 151, a system control unit 16, and a communication control unit 17. The MFP 10 is connected to a network 18 via the communication control unit 17. The MFP 10 scans an image of an original 19, applies image processing to the image, and outputs the image as a print 20.

The system control unit 16 is connected to the respective units and controls the MFP 10. For example, the system control unit 16 provides the scanner 11 with scanning area information appropriate for a selected sheet size. The system control unit 16 includes a central processing unit (CPU), a read only memory (ROM), and a random access memory (RAM). The CPU operates while using a work area of the RAM based on a computer program stored in the ROM, whereby various kinds of processing are performed.

The computer program executed in the MFP 10 can be stored in a computer readable recording medium such as a compact disk-read only memory (CD-ROM), a flexible disk (FD), a compact disk-recordable (CD-R), or a digital versatile disk (DVD) as a file of an installable format or an executable format. In this case, the CPU of the system control unit 16 loads the computer program from the recording medium into a main storage (not shown) to execute it, whereby various functions of the MFP 10 can be realized. The computer program can be stored in a computer connected to the MFP 10 via the network 18 such as the Internet, and downloaded therefrom through the network 18. The computer program can also be distributed through the network 18.

The communication control unit 17 is connected to the network such as a local area network (LAN) or the Internet and exchanges image data, control data, and the like with other apparatuses connected to the network according to a communication protocol.

The scanner controller 112 receives a command from the system control unit 16 and controls the scanner 11 to receive input of image data.

The scanner 11 is controlled by the scanner controller 112 and converts an image of the original 19 into digital image data. The ADF 111 sequentially delivers a plurality of pages of originals set thereon to a scanning position of the scanner 11. Thus, the scanner 11 can automatically and sequentially scan the originals. The ADF 111 can deliver not only an original printed on one side thereof but also an original printed on both sides thereof by reversing the original. Thus, the scanner 11 can scan the both sides of original.

The image storing unit 12 is a buffer memory that receives a command from the system control unit 16 and temporarily stores therein image data scanned by the scanner 11, image data input from the outside through the network 18, and the like. The MFP 10 can process image data input from the outside through the network 18 as well as image data scanned by the scanner 11 to form an image.

The image processing unit 13 receives a command from the system control unit 16, applies γ correction, modulation transfer function (MTF) correction, and the like to multi-value data sent from the scanner 11 and the network 18, and temporarily stored in the image storing unit 12. The image processing unit 13 performs gradation processing such as slicing and dithering on the data, and digitalizes (multi-value) the data. The image processing unit 13 performs various kinds of image processing (reduce/enlarge, adjustment of density and colors, etc.) corresponding to functions set by a user, image-area edit (area erasure, area movement, area reversal, etc.); and layout processing (duplex/simplex printing, image combining, margin adjustment, etc.). Thus, the image processing unit 13 creates a preview image indicating a finished state of an image.

The image processing unit 13 includes a preview creating unit 131, a screen information generating unit 132, and a setting unit 133.

Basically, the preview creating unit 131 creates a preview of the original image (a preview image) based on settings or parameters specified for processing image data obtained by pre-scanning an original image and displayed on a display panel 15b. Namely, the preview creating unit 131 creates a preview image indicating results of processing an original image. The preview creating unit 131 uses the multi-value data temporarily stored in the image storing unit 12.

The screen information generating unit 132 generates input screen information displayed on the display panel 15b. The input screen information includes various types of setting items for the preview image created by the preview creating unit 131.

When the user provides setting input on an input screen 400 (see FIG. 2) displayed on the display panel 15b through a touch panel 15a, described later, the setting unit 133 receives a signal of the setting input and acquires coordinate information related to an input image stored in the image storing unit 12. Thus, the process corresponding to the coordinate information is set for the screen information generating unit 132.

When the setting unit 133 receives a setting-input signal, the preview creating unit 131 updates the preview image according to the setting-input signal, and outputs update preview image to the display control unit 151.

The screen information generating unit 132 generates, according to the setting-input signal received by the setting unit 133, input screen information for display of a screen for receiving setting input from the user again. The screen information generating unit 132 outputs the input screen information to the display control unit 151.

The display control unit 151 receives a command from the system control unit 16 and controls input and output of the display unit 15. For example, the display control unit 151 controls to output the data processed by the image processing unit 13 to the touch panel 15a and the display panel 15b. More specifically, the display control unit 151 causes the display panel 15b to display a preview image created by the screen information generating unit 132. The display control unit 151 controls input from the touch panel 15a. The display panel 15b and the touch panel 15a are separately shown in FIG. 1; however, they are explained as being integrated in the following description.

The touch panel 15a detects a position with which a pointer makes an electric or magnetic contact. As pointing means (not shown) for pointing a position on the touch panel 15a, a fingertip, a stylus pen, and other touch input tools (hereinafter, "pointers") can be used. The user inputs various settings or parameters including print setting by touching the touch panel 15a with such a pointer.

In the first embodiment, an example is explained in which input is provided by touching the touch panel 15a. However, input can be provided in other manners. For example, the display unit 15 can include a key as hardware (physical key) that a user presses to issue a command such as a print command. As the display panel 15b, a dedicated display device included in the MFP 10 can be used.

The display unit 15 is controlled by the display control unit 151, receives input of setting details via the touch panel 15a, and displays a preview image and setting items for specifying settings as to the preview image on the display panel 15b.

The display unit 15 displays functions available in the MFP 10 as setting items and receives from the user setting input indicating a setting item selected from the setting items. When a user touches with the pointer a position on the touch panel 15a, a coordinate of the position is detected. When the position is in an area corresponding to a setting item (where the setting item is selectable), the display control unit 151 determines that the setting item is selected. For example, the display unit 15 receives setting of scanning conditions for the scanner 11 corresponding to the state of an original, setting for the image processing unit 13 that performs processing such as image-quality adjustment on scanned image data, setting of print conditions for the printer 14, and setting for the finishing unit 141 that applies finishing, such as sorting, stapling, and punching, to a print after printing.

Upon receiving the a setting as described above via the display control unit 151, the system control unit 16 causes the image processing unit 13 to create a preview image by reflecting the setting on the original image data stored in the image storing unit 12. The system control unit 16 sends the preview image to the display unit 15 such that the display unit 15 displays the preview image.

Figure 2:
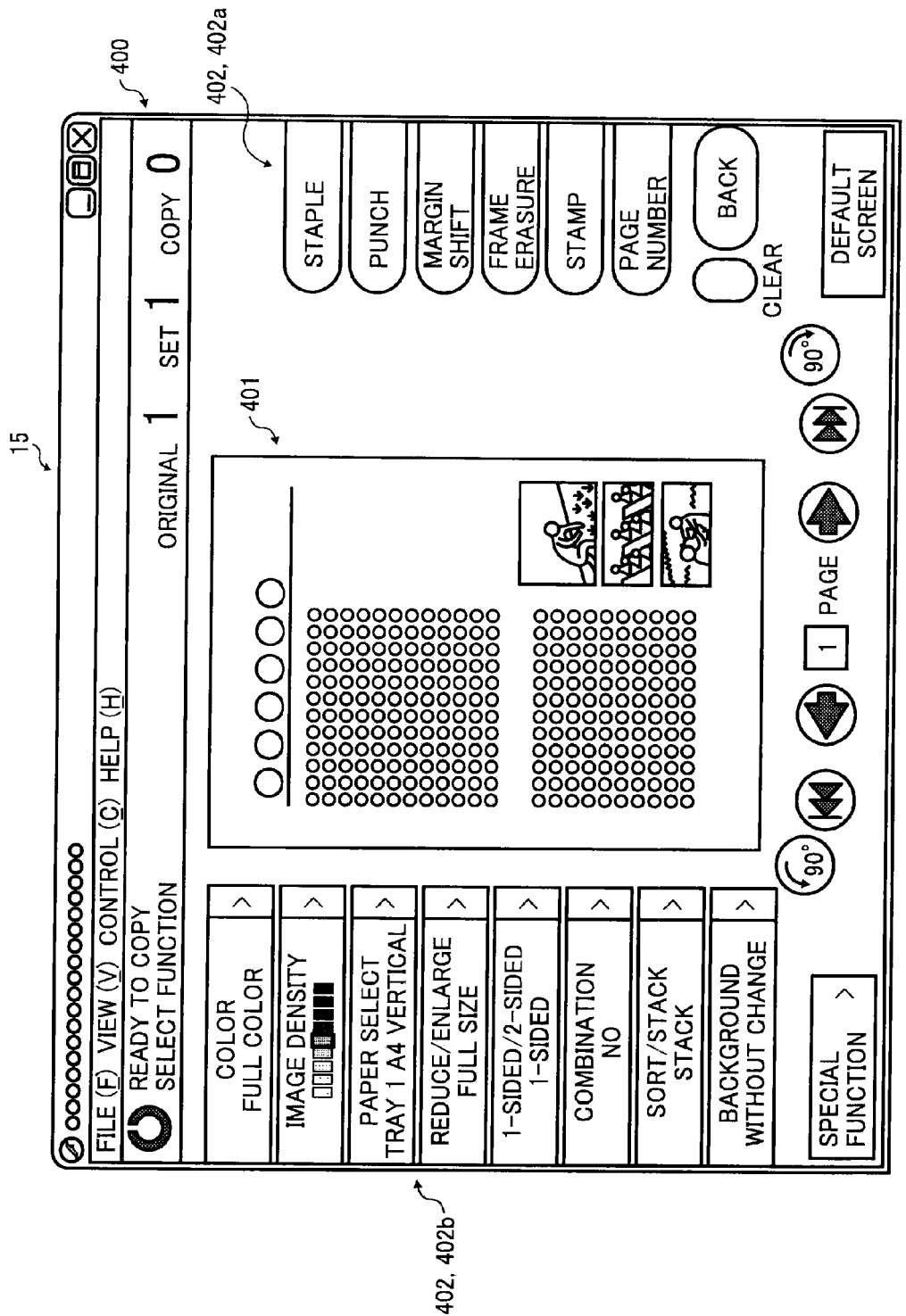
FIG. 2 is an example of an input screen displaying a preview image created by a preview creating unit shown in FIG. 1.

FIG. 2 is an example of a preview image created by the preview creating unit 131 from input image data. A preview image 401 and setting items 402 are displayed on the display panel 15b. As the setting items 402, a menu 402a related to positions on the preview image 401 such as staple, punch, margin shift, frame erasure, stamp, and page number is displayed on the right side of the screen. Menu 402b not related to contents such as an output color, output density, sheet, reduce/enlarge, one-sided/two-sided, combination, sort and stack, and background is displayed on the left side of the screen.

When the user touches the touch panel 15a with the pointer while viewing the preview image 401 displayed on the display panel 15b, the touch panel 15a receives input of positional information concerning a spatial position on a print in a finished state displayed as the preview image 401. In such a case, the setting unit 133 analyzes the positional information received through the touch panel 15a and acquires coordinate information on an image with which the pointer comes into contact.

With such a structure, the MFP 10 displays, prior to actual copy printing, the preview image 401 on the display panel 15b. After checking the preview image 401 visually, the user can change the setting when necessary and perform actual printing.

More specifically, it is possible to perform copying reliably according to a series of processes: (1) pre-scanning an original, (2) displaying an image of the original pre-scanned on a screen as a preview image, (3) when a user touches a predetermined position on the preview image, displaying a menu of functions corresponding to the position, (4) when the user selects one of the functions, immediately reflecting the function in the preview image, and, (5) after checking the update preview image on the screen, starting printing.

Figure 3:
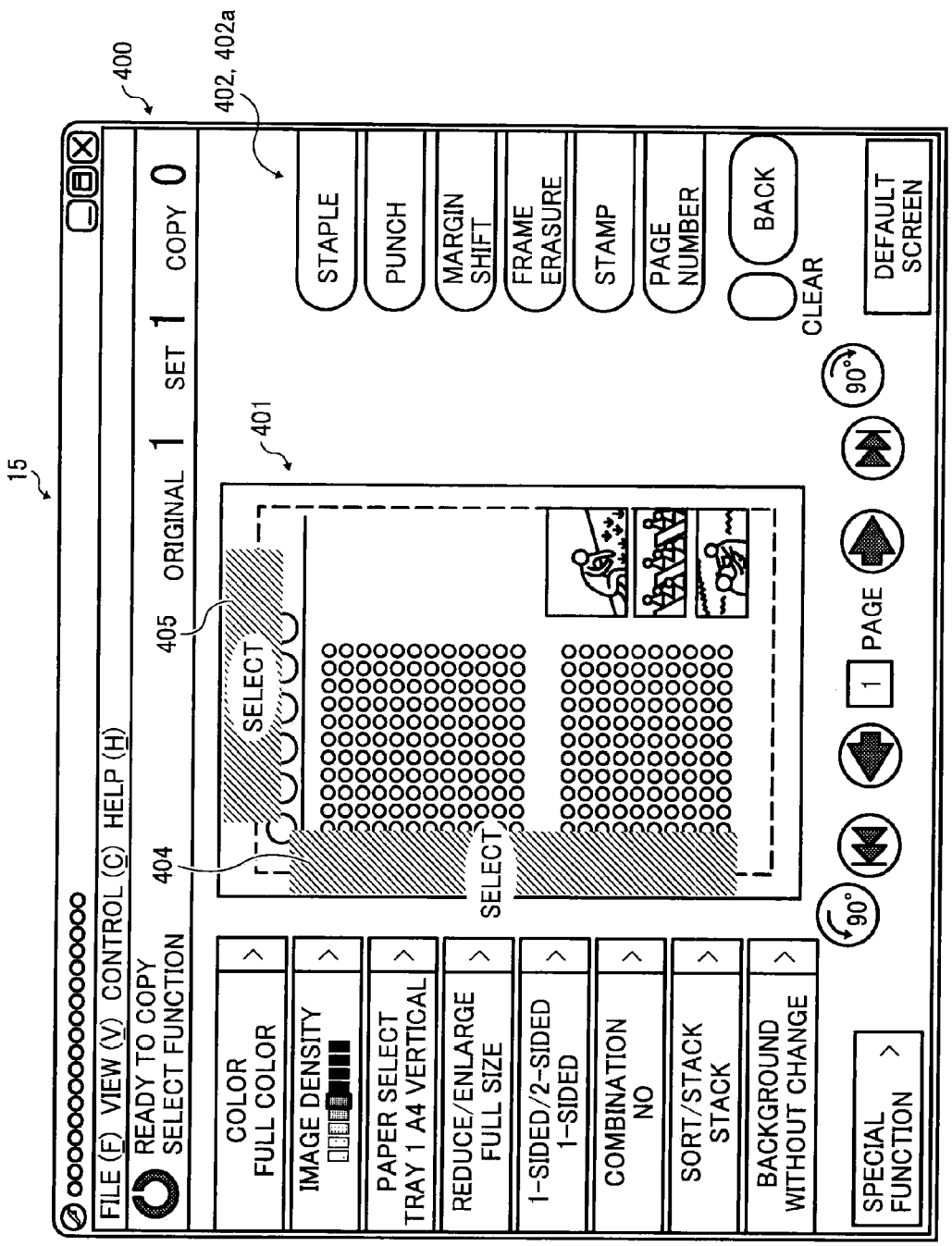
FIG. 3 is the input screen displaying a preview image where setting items are selected.

As shown in FIG. 3, it is assumed that punch is selected from the setting items 402 (the menu 402a) displayed on the display unit 15 by touch input from the user.

When the display unit 15 detects a touch on the punch key displayed thereon, the system control unit 16 receives setting of the punch via the display control unit 151. The screen information generating unit 132 reads out an area corresponding to the punch from an association table. In the association table, as shown in FIG. 4, functions corresponding to the setting items 402 are associated with areas where the functions is to be applied. The association table is stored in, for example, the RAM of the system control unit 16. The screen information generating unit 132 displays areas 404 and 405 where the punch can be applied on the display unit 15. The areas 404 and 405 where punch holes can be opened can be displayed in the preview image 401 in an overlapping form or an overwrite form. The areas 404 and 405 can also be displayed with a different color, as being blinking, or with other areas darkening out. The areas indicated by the association table shown in FIG. 4 are defined by a rectangle having sides parallel in main scanning and sub-scanning directions, respectively, defined by diagonal lines each connecting two points defined by coordinates. For example, an area for "staple" is defined by a line from (0,0) to (40,40) and a line from (120,0) to (160,40).

Figure 5:
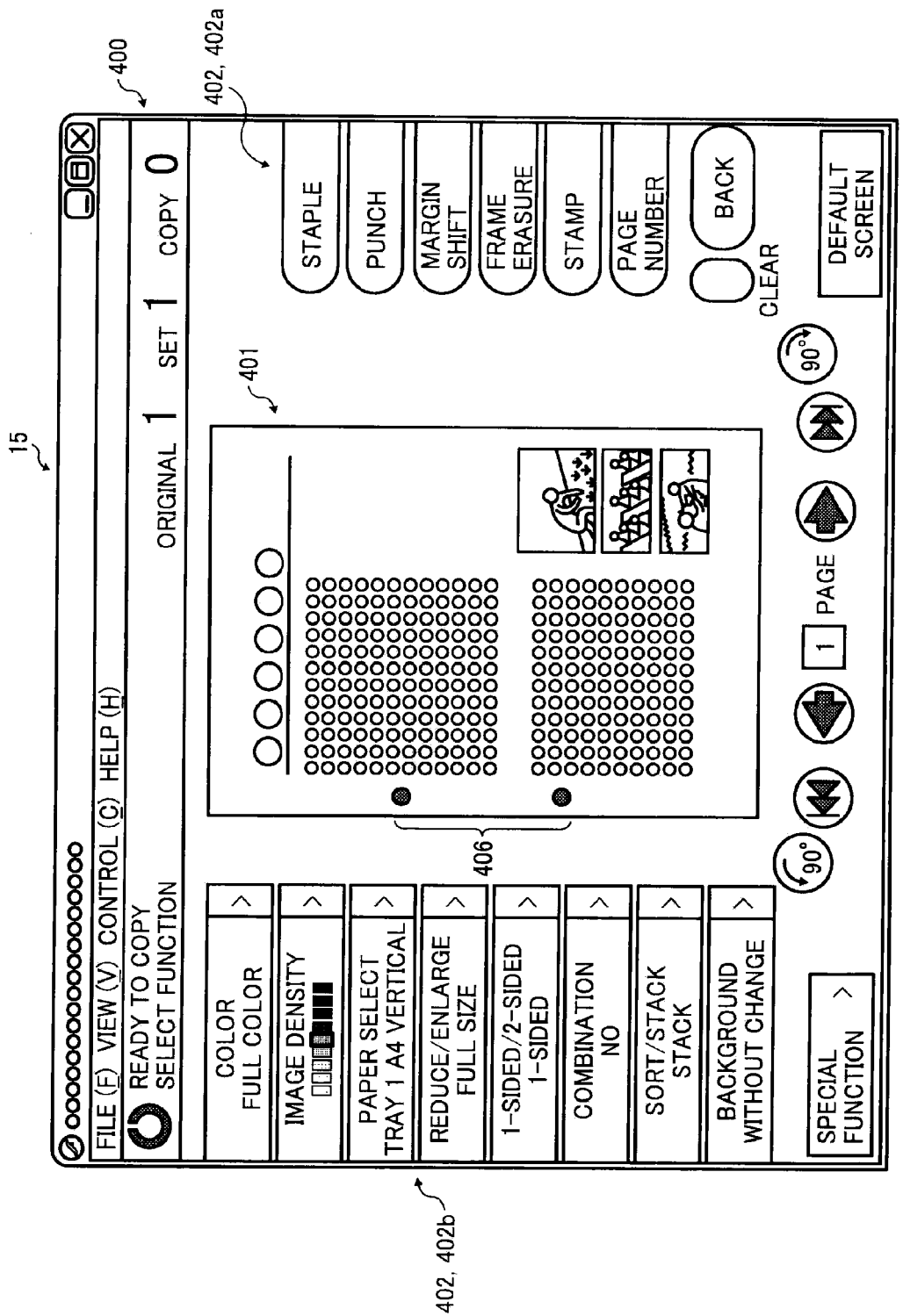
FIG. 5 is the input screen displaying a preview image to which punching has been applied.

The user provides touch input by touching the punch hole area 404 shown in FIG. 3. The display unit 15 receives the touch input on the punch key. The preview creating unit 131 creates a preview image by reflecting the setting for applying punching in the area, sends the preview image to the display unit 15. Accordingly, the display unit 15 displays the preview image. The preview image 401 subjected to punching 406 is shown in FIG. 5. Setting input such as correction is received through the preview image 401 displayed in this way. The setting is reflected and displayed again. When there is no setting input, printing is performed.

Although not shown, when the user touches a specific position on the preview image, a menu of functions related to the position can be displayed, such that when a user selects one of the functions, the function can be immediately reflected in the preview image.

In addition, the MFP 10 is capable of displaying a plurality of preview images with different settings applied to them to allow a user to select the most suitable one, thus reducing the time required for setting operation.

Figure 6:
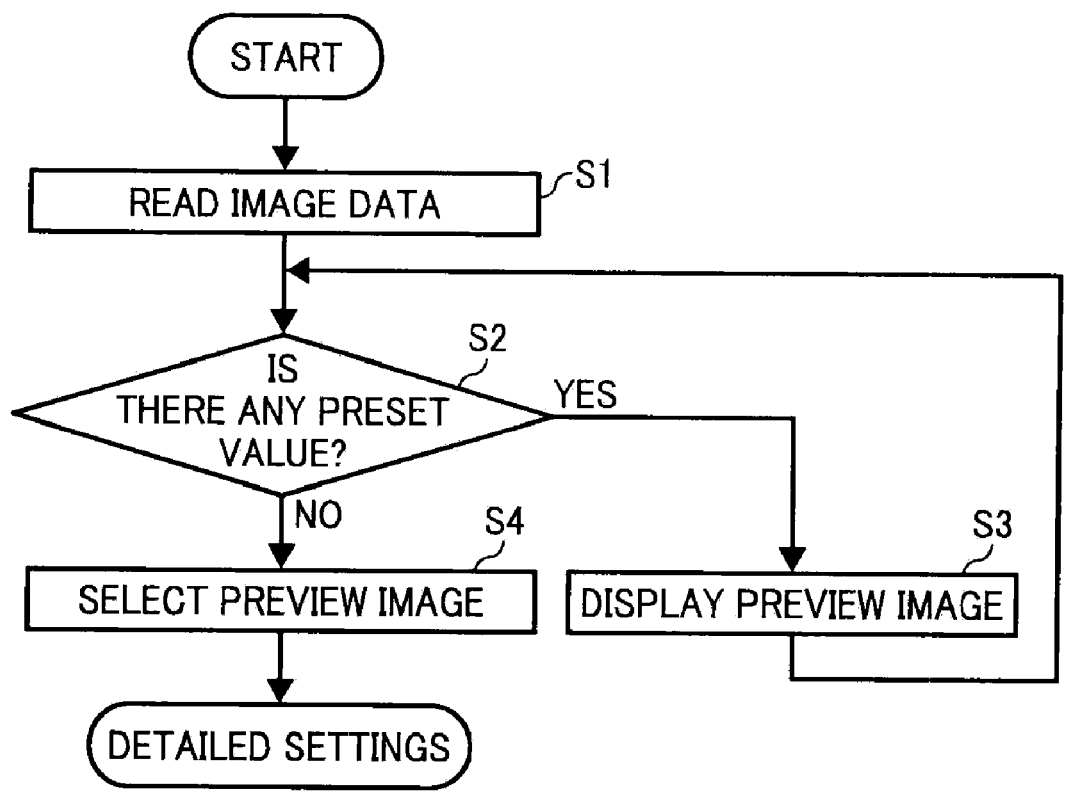
FIG. 6 is a flowchart of a preview-image displaying process according to the first embodiment.

FIG. 6 is a flowchart of a preview-image displaying process according to the first embodiment. The preview-image displaying process is performed when a predetermined mode is selected. As shown in FIG. 6, in the preview-image displaying process, image data is read from the image storing unit 12 (step S1), and it is determined whether there is any remaining preset value applied to the image (step S2). The term "preset value" as used herein refers to preset settings for processing the image data (for example, various imaging processes (such as zoom ratio and density/color adjustment), or for image area editing processes (such as cropping, moving, rotating), or for layout processes (such as duplex/simplex printing, multiple pages per sheet printing, and margin adjustment), and finishing processes (such as sorting, stapling, and punching). It is assumed herein that a plurality of preset values is already applied to the image data.

Figure 7:
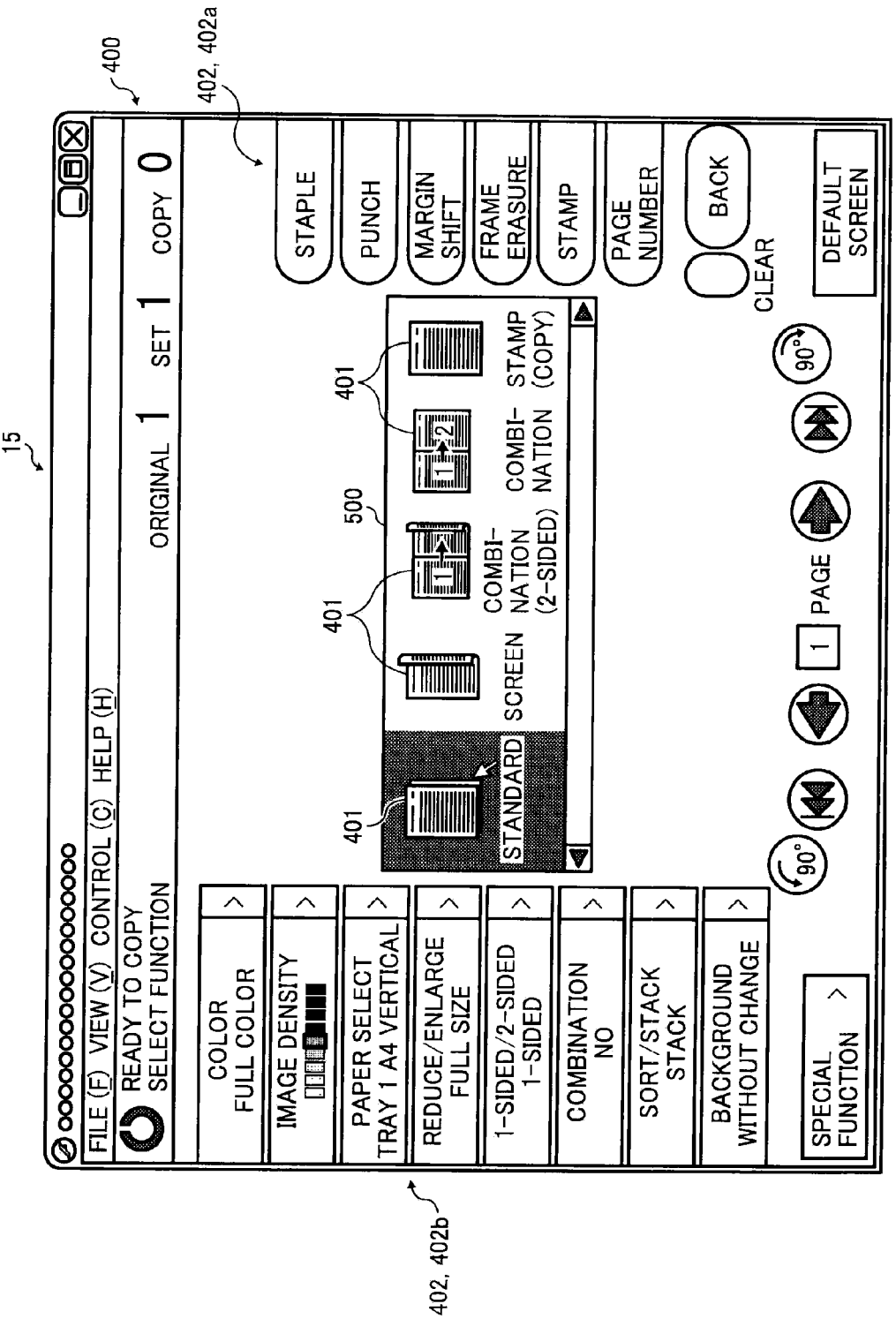
FIG. 7 is the input screen displaying a plurality of preview images.

If a preset value is remaining (Yes at step S2), the process proceeds to step S3 at which a preview image is created based on the next preset value and sent to the display unit 15 to be displayed. More specifically, the system control unit 16 controls the preview creating unit 131 to sequentially create preview images according to the preset values and controls the screen information generating unit 132 to generate input screen information listing the plurality of preview images created by the preview creating unit 131, and to forward the input screen information to the display unit 15 to be displayed. FIG. 7 is the input screen 400 in which a plurality of preview images 401 is displayed in a list form. As shown in FIG. 7, the input screen 400 displays a listing screen 500 to show a list of the preview images 401 created according to the preset values.

The steps S2 and S3 are repeated until all the preset values have been dealt with (No at step S2), and the process proceeds to step S4 at which the system stands by for selection of a preview image.

When a preview image is selected (step S4), the zoomed-in view of the selected preview image is displayed on the display unit 15, as shown in FIG. 2, and the system stands by for detailed settings. More specifically, upon receiving a signal indicating that one of the preview images displayed in the listing screen 500 via the display control unit 151, the system control unit 16 controls the image processing unit 13 to output the selected preview image to the display unit 15 to be displayed magnified (see FIG. 2).

As described above, according to the first embodiment, a plurality of preview images are created according to different preset settings specified for an image to show various finished states of the image corresponding to the preset settings. The preview images are displayed to allow a user to select the most suitable one. Consequently, less time is required for specifying settings for image data as compared to the conventional technologies in which a preview image is created after the selection of a finishing process to be applied to image data is to be subjected. Thus, setting operation can be simplified, which enhances operability for users.

A second embodiment of the present invention is explained below with reference to FIG. 8. Like reference numerals refer to corresponding parts previously identified and described in the first embodiment, and the same description is not repeated.

In the first embodiment, the preview images 401 created based on the preset values are listed in the order of the preset values. In the second embodiment, the preset values are arranged in the order from the most frequently selected to the least frequently selected, and likewise, the preview images 401 are listed in that order.

Figure 8:
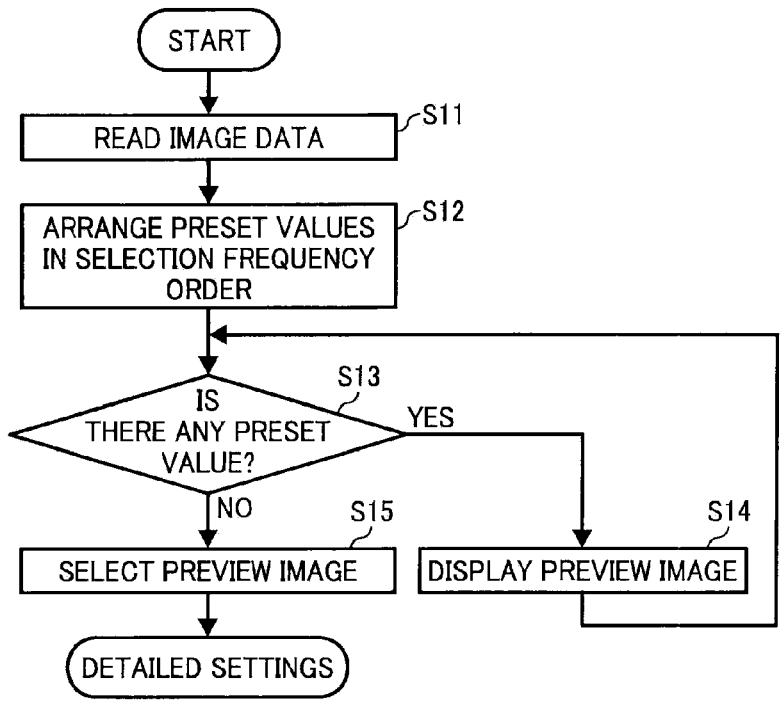
FIG. 8 is a flowchart of a preview-image displaying process according to a second embodiment of the present invention.

FIG. 8 is a flowchart of a preview-image displaying process according to the second embodiment. In the preview-image displaying process according to the second embodiment, the image data stored in the image storing unit 12 is read (step S11) and the preset values are arranged in the order of selection frequency, from the most frequently selected to the least frequently selected (step S12).

The process of arranging the preset values according to the selection frequency is described below. When an input signal indicating selection of one of the preview images 401 listed in the listing screen 500 is received, the selection count of the preset value of the selected preview image is added to the count stored in the RAM of the system control unit 16. In this way, the selection counts of all the preset values are stored in the RAM, thus enabling arranging the preset values based on their selection counts, from the most to the least.

If a preset value is remaining (Yes at step S13), the process proceeds to step S14 at which a preview image is created based on the next preset value and sent to the display unit 15 to be displayed (see FIG. 7).

The steps S13 and S14 are repeated until all the preset values have been dealt with (No at step S13), and the process proceeds to step S15 at which the system stands by for selection of a preview image.

When a preview image is selected (step S15), the zoomed-in view of the selected preview image is displayed on the display unit 15, as shown in FIG. 2, and the system stands by for detailed settings.

As described above, according to the second embodiment, a plurality of preview images are created according to different preset settings specified for an image to show various finished states of the image corresponding to the preset settings. The preview images are displayed to allow a user to select the most suitable one. Consequently, less time is required for specifying settings for image data as compared to the conventional technologies in which a preview image is created after the selection of a finishing process to be applied to image data. Thus, setting operation can be simplified, which enhances operability for users.

Further, preview images are displayed in the descending order of selection frequency of preset values, which also simplifies setting operation.

A third embodiment of the present invention is described next with reference to FIG. 9. Like reference numerals refer to corresponding parts previously identified and described in the first embodiment, and the same description is not repeated.

In the first embodiment, the preview images 401 created based on the preset values are listed in the order of the preset values. In the third embodiment, the preset values are arranged according to the attribute value of the image data, and likewise, the preview images 401 are listed in the order of arranged preset values.

Figure 9:
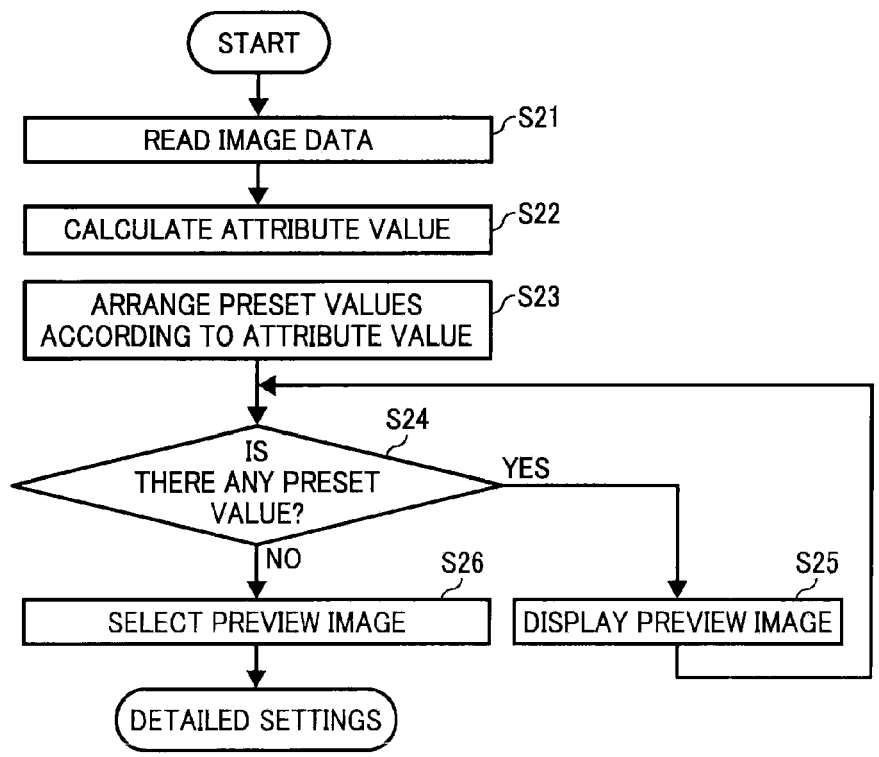
FIG. 9 is a flowchart of a preview-image displaying process according to a third embodiment of the present invention.

FIG. 9 is a flowchart of a preview-image displaying process according to the third embodiment. After the image data stored in the image storing unit 12 is read (step S21), the attribute value of the image data is calculated (step S22), and the preset values are arranged according to the attribute value of the image data (step S23).

How attribute value is calculated from the image data is described below. Some examples of attribute value are setting count, total sheet consumption amount, and total toner consumption amount. Taking setting count as an example of the attribute value, the number of times each preset value is set is calculated and the preset values are arranged in the descending order of the setting count, and the preview images are displayed in the order of the preset values, and user selection of a preview image is awaited. The same procedure is followed for the other attribute values, namely, total sheet consumption amount and total toner consumption amount. However, the preset values in these cases are arranged in the ascending order of the attribute value.

If a preset value is remaining (Yes at step S24), the process proceeds to step S25 at which a preview image is created based on the next preset value and sent to the display unit 15 to be displayed (see FIG. 7).

The steps S24 and S25 are repeated until all the preset values have been dealt with (No at step S24), and the process proceeds to step S26 at which the system stands by for selection of a preview image.

When a preview image is selected (step S26), the zoomed-in view of the selected preview image is displayed on the display unit 15, as shown in FIG. 2, and the system stands by for detailed settings.

As described above, according to the third embodiment, a plurality of preview images are created according to different preset settings specified for an image to show various finished states of the image corresponding to the preset settings. The preview images are displayed to allow a user to select the most suitable one. Consequently, less time is required for specifying settings for image data as compared to the conventional technologies in which a preview image is created after the selection of a finishing process to be applied to image data. Thus, setting operation can be simplified, which enhances operability for users.

Further, because preview images are displayed according to attribute values of image data, a user can obtain a desired result with simplified setting operation.

As set forth hereinabove, according to an embodiment of the present invention, less time is required for specifying settings for an image to finish the image. Thus, setting operation can be simplified which enhances operability for users.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
a first preview creating unit that creates a plurality of first previews of an image corresponding to a plurality of preset values each indicating one or more layout or finishing processes to be applied to the image;
a first displaying unit that displays the first previews in a selectable manner on a display screen;
a second displaying unit that displays, upon receiving a signal indicating a preview selected from the first previews, selected preview on the display screen;
a second preview creating unit that updates, upon receiving input of setting for the selected preview, the selected preview based on the setting to create a second preview; and
a third displaying unit that displays the second preview on the display screen.

2. The image processing apparatus according to claim 1, wherein the first displaying unit displays the first previews in order in which the preset values have been set.

3. The image processing apparatus according to claim 1, wherein the first displaying unit displays the first previews in order of number of times the preset values have been selected.

4. The image processing apparatus according to claim 1, wherein the first displaying unit displays the first previews arranged according to an attribute value of the image.

5. An image forming apparatus, comprising:
an input unit that receives input of an image;
a first preview creating unit that creates a plurality of first previews of the image corresponding to a plurality of preset values each indicating one or more layout or finishing processes to be applied to the image;
a first displaying unit that displays the first previews in a selectable manner on a display screen;
a second displaying unit that displays, upon receiving a signal indicating a preview selected from the first previews, selected preview on the display screen;
a second preview creating unit that updates, upon receiving input of setting for the selected preview, the selected preview based on the setting to create a second preview;
a third displaying unit that displays the second preview on the display screen; and
a printing unit that prints the image based on the second preview.

6. The image forming apparatus according to claim 5, wherein the first displaying unit displays the first previews in order in which the preset values have been set.

7. The image forming apparatus according to claim 5, wherein the first displaying unit displays the first previews in order of number of times the preset values have been selected.

8. The image forming apparatus according to claim 5, wherein the first displaying unit displays the first previews arranged according to an attribute value of the image.

9. A computer program product comprising a non-transitory computer readable medium having computer readable program codes embodied in the medium that, when executed, causes a computer to execute:
creating a plurality of first previews of an image corresponding to a plurality of preset values each indicating one or more layout or finishing processes to be applied to the image;
first displaying the first previews in a selectable manner;
second displaying, upon receipt of a signal indicating a preview selected from the first previews, selected preview;
updating, upon receipt of input of setting for the selected preview, the selected preview based on the setting to create a second preview; and
third displaying the second preview.

10. The computer program product according to claim 9, wherein the first displaying includes displaying the first previews in order in which the preset values have been set.

11. The computer program product according to claim 9, wherein the first displaying includes displaying the first previews in order of number of times the preset values have been selected.

12. The computer program product according to claim 9, wherein the first displaying includes displaying the first previews arranged according to an attribute value of the image.

13. The computer program product according to claim 9, wherein the plurality of preset values are values for setting one or more of duplex/simplex printing, multiple pages per sheet printing, and margin adjustment.

14. The computer program product according to claim 9, wherein the plurality of preset values are values for setting one or more of sorting, stapling, and punching.

* * * * *